United States Patent [19]
Korb et al.

[11] Patent Number: 5,803,678
[45] Date of Patent: Sep. 8, 1998

[54] HOLE CUTTING TOOLS

[75] Inventors: William B. Korb, Melrose, Conn.; James R. Holston, Orange; Stephen A. Hampton, East Longmeadow, both of Mass.

[73] Assignee: American Saw & Mfg. Company, East Longmeadow, Mass.

[21] Appl. No.: 492,801

[22] Filed: Jun. 20, 1995

[51] Int. Cl.$^6$ ..................................... B23B 51/05
[52] U.S. Cl. ......................... 408/206; 408/207; 408/224
[58] Field of Search ..................... 408/204, 206, 408/207, 209, 224, 703; 144/20, 23

[56] References Cited

U.S. PATENT DOCUMENTS

| | | | |
|---|---|---|---|
| 3,430,526 | 3/1969 | Valenziano | 408/204 |
| 3,548,687 | 12/1970 | Holloway | 408/206 |
| 3,648,508 | 3/1972 | Hougen . | |
| 3,961,858 | 6/1976 | Smith et al. . | |
| 4,500,234 | 2/1985 | Orth et al. | 408/204 |
| 4,767,245 | 8/1988 | Shoji et al. | 408/204 |
| 4,813,819 | 3/1989 | Hougen | 408/204 |
| 4,968,192 | 11/1990 | Hamilton | 408/204 |
| 5,016,497 | 5/1991 | Sundström . | |
| 5,410,935 | 5/1995 | Holston et al. . | |

FOREIGN PATENT DOCUMENTS

| | | | |
|---|---|---|---|
| 249671 | 5/1948 | Switzerland | 408/224 |
| 557335 | 11/1943 | United Kingdom | 408/206 |

OTHER PUBLICATIONS

Partial Translation of German Patent 383,221, Published Oct. 11, 1923.

*Primary Examiner*—Daniel W. Howell
*Attorney, Agent, or Firm*—McCormick, Paulding & Huber

[57] ABSTRACT

An improved hole saw for cutting holes having a cylindrical shape that includes, along its cutting edge, a plurality of repetitive groups of saw teeth having at least four radially displaced trailing teeth. The displacement of each trailing tooth is such that it has a substantially greater displacement than for any other tooth of said group preceding said trailing tooth. The displacement of each tooth being such that the cutting edge thereof is characterized as being movable along a cutting path different from the cutting paths of the other teeth of the group as the hole saw is rotated whereby each tooth cuts chips of uniform size. Each group of teeth may include a raker tooth having no substantial displacement with respect to the side surfaces of the hole saw. The raker tooth may be the same height or of greater height than the trailing teeth.

12 Claims, 2 Drawing Sheets

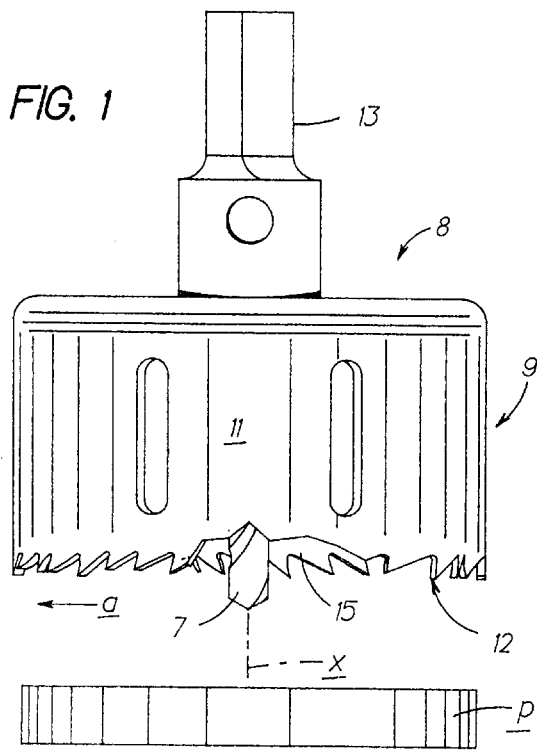
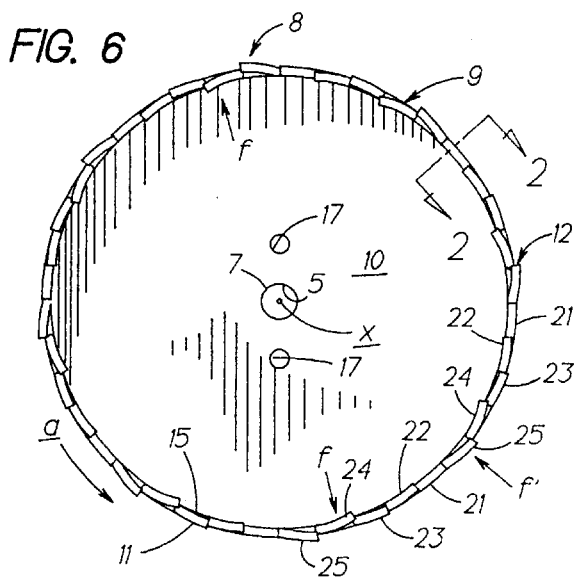
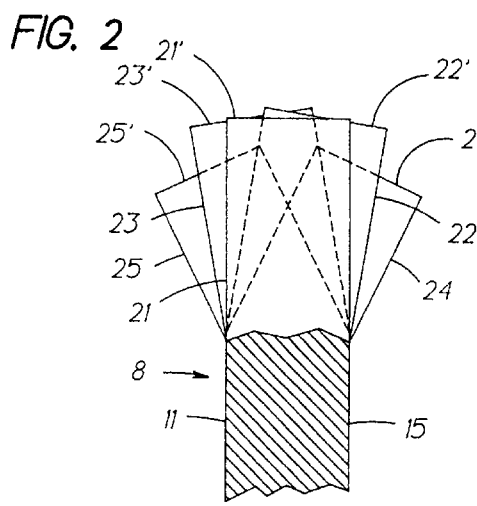
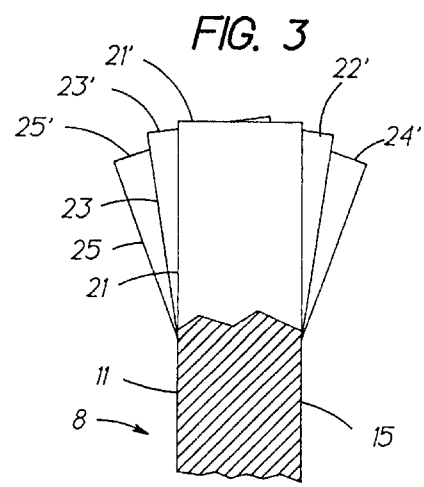
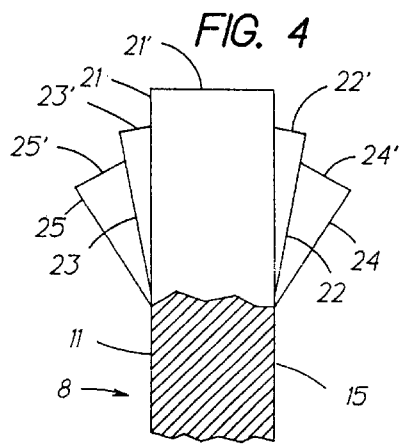
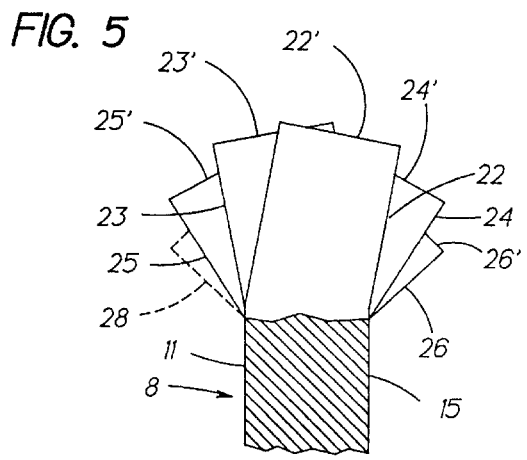

HOLE CUTTING TOOLS

FIELD OF THE INVENTION

This invention relates to hole cutting tools and more particularly to such tools as include a rotatable cutter of cylindrical configuration having a repetitive saw tooth pattern disposed along the cutting edge thereof such that each tooth of the pattern is adapted to cut chips of uniform size.

BACKGROUND OF THE INVENION

Historically, tools for cutting holes have generally included twist drill bits for holes of smaller diameter and auger bits for holes of larger diameter. In more recent years, spade bits and hole saws have generally replaced the auger in the larger diameter applications, with the hole saws usually being used for making holes larger than 1-inch in diameter and being adapted to be driven by a drill press or power drill. Indeed, in recent years hole saws have become popular among those in the building trades, especially plumbers and electricians.

In U.S. Pat. No. 3,648,508, a hole saw is disclosed with the teeth thereof being flared outwardly of the outer cylindrical surface of the hole saw for improved performance. The teeth are also formed with their high points at the outer edges and, alternate of the teeth, are set to extend inwardly over somewhat less than one-half the circumference of the cylindrical cutter. It is claimed that this hole saw construction provides longer wear and more accurate cutting.

In the past, hole saws have been almost universally manufactured with teeth of uniform height measured from a reference line disposed at a predetermined distance generally parallel to the back edge of the cylindrical cup and with one level of set. One contemporaneous development was to employ variable pitch in order to reduce vibration and a common tooth arrangement involved a five tooth group comprising: one raker, or unset tooth and at least four alternately set teeth and with all teeth being of the same height before the lateral setting thereof outwardly of opposite side surfaces of the cylindrical cutting tool. More recently, it has become the equally prevalent practice to provide such hole saws with seven tooth repetitive groups in which each group comprises an unset raker tooth and six alternately set teeth. In either the five or seven tooth group, the teeth are of variable pitch in which the teeth first decrease and then increase in pitch and gullet depth.

One major drawback of such prior hole saw constructions is due to closely spaced teeth of uniform height and one level of set which result in relatively shallow tooth penetration, particularly when cutting hard-to-cut materials, such as certain metals, including stainless steel, for example. Other problems that may arise because of the inability of the teeth to accommodate the chips cut from such materials, are tooth breakage which result in tool failure. In addition, there is a tendency for such teeth, when filled to capacity, to slip or skid over the surface of work being cut with a rubbing action that may result in work hardening.

Although band saw blade technology has been changing dramatically over the last ten to fifteen years, with greater emphasis being placed on various tooth arrangements, during the same period of time, hole saws with very few exceptions have remained basically unaffected by such changes.

In the saw blade industry and in many recently issued patents which disclose and claim recent improvements in band saw blades, it has generally been considered "a given" that such advances in band saw blades would be suitable for other types of saw blades, including hack saws, reciprocal saw blades and circular saws. There does not appear to be any suggestion, however, that such advances would be advantageous if adapted to hole saw construction. For example, such arrangements have included repetitive groups of teeth arranged along the length of the band saw blade in which the teeth making up each group, comprises a raker tooth followed by pairs of set teeth. The pairs of such teeth are generally of decreasing height and increasing set from the leading to the trailing pair of teeth of each group, with each of the teeth of any one pair being of the same height and of equal and opposite lateral set.

In recent years, for an example, in the following interrelated U.S. Pat. Nos. Nos. 4,727,788; 4,813,324; 4,827,822 and 4,958,546 assigned to Amada, on the order of twenty different tooth groups or arrangements, are disclosed. In none of the above-referenced patents, however, does one find any suggestion that the tooth arrangements would be adaptable to hole saws. One reason for the absence of prior art which relates to such saw tooth arrangements to hole saws is that, traditionally, such tools have not come within the ambit associated with saw blades.

There are, moreover, fundamental distinctions in the construction and operation of those two cutting tools. Among the significant differences between band saw blades and hole saws are: the planarity and flexibility of the former versus the cylindricality and rigidity of the latter; the linear motion of the former versus the rotational motion of the latter. Only a relatively small fraction of the teeth of a band saw are simultaneously engaged with the work being cut, whereas all the teeth of a hole saw are engaged with the work when cutting the same. Band saw blades, being of planar configuration, are inherently sensitive to vibrations and lateral deviations or vibrations whereas hole saws which are of cylindrical construction, substantially greater rigidity and circumferential cutting motion are not inherently sensitive to lateral deviations or vibrations.

In view of the fundamental differences between band saws and hole saws and the apparent failure of those skilled in either band saws, or in the hole saws arts to recognize the transmutability of some aspects of band saw blade technology to hole saws, it is not surprising that there have not been any significant changes in hole saws over the last several years. In that connection, U.S. Pat. No. 5,410,935, granted on May 2, 1995, relates to saw blades and is concerned with overcoming the problems of saw blade vibration and wobble while providing a saw blade construction capable of cutting difficult-to-cut materials, such as stainless steel. This patent was assigned to the same assignee as the present application and like so many earlier saw blade patents, it makes no reference to hole saws. Usually, a saw blade is provided repetitive groups of teeth and although the number, type of teeth and the arrangement of the individual teeth may vary in different saws, there are certain characteristics which can be found in all such groups.

Usually, each group starts with a raker tooth, thereafter there are invariably an equal number of alternately set teeth, such as four or six, which comprise oppositely set pairs of teeth. In most saw blades, the leading pair of teeth are usually longer and have a lighter set than the trailing pair(s) which are generally shorter and have a heavier setting. Because these group features are considered important in minimizing vibration or wobble imparted to the teeth of the saw blade, they are invariably replicated throughout the cutting edge of the blade. Earlier this year, a copending application, Ser. No. 08/408,847, was filed in the U.S. Patent and Trademark Office on Mar. 23, 1995, which relates to a novel saw tooth arrangement for saws and particularly band saw blades. At about the same time, evaluations were ongoing with respect to the invention of the present application. It was only as a result of the concurrent evaluations on behalf of the same assignee that it was deemed appropriate to evaluate the use on hole saws of various saw tooth arrangements previously confined to planar saw blades and, more particularly, to band saw blades. The highly favorable nature of such evaluations have unexpectedly demonstrated that hole saws, as disclosed herein, perform so much better than conventional hole saws currently on the market and provide strong incentives for manufacturing and marketing a superior new line of hole saws, as well as a plausible basis for the filing of this application.

Apparently, those skilled in the art had not previously recognized that the "cookie cutter" type hole saw, with its rigid, cylindrical construction, would benefit by the use of certain tooth arrangements adapted from the more flexible linear saw blades.

DISCLOSURE OF THE INVENION

It is the principal object of this invention to provide an improved cylindrical hole saw having a cutting tooth arrangement adapted to improve wear life when cutting materials, such as stainless steel.

It is another object of this invention to provide a hole saw of the above type for cutting holes through a variety of materials which are characterized by improved cutting speed and tool life.

Cutting tools of cylindrical configuration, of the type which embody this invention, are those in which one edge of the cylinder comprises repetitive groups of teeth. Each group of teeth comprises a plurality of individual teeth arranged in any order with respect to their height and the amount and direction of radial displacement. In addition, the teeth of each group may vary, for example, from an arrangement in which each of two set teeth may be radially displaced outwardly of opposite side surfaces of the cylindrical body of the tool. In another arrangement, some predetermined portion of the number of set teeth in each group may be consecutively disposed along one side of the cylinder and the remainder of the teeth may be disposed consecutively along the other edge of the cylindrical body of the hole saw. The principal criterion, is that the cutting edge of each tooth of the group be disposed in a surface of rotation, or revolution, different from that of the other teeth of the group. This construction is such that the cutting edge of each tooth is not masked nor eclipsed by the cutting edges of any preceding tooth of the group. Each of the teeth can therefore be said to have an accumulated pitch distance equal at least to the number of teeth in each group.

BRIEF DESCRIPTION OF THE DRAWINGS

FIG. 1 is a side elevational view of a hole saw, partly in section, of the type embodying this invention;

FIG. 2 is a sectional view taken along line 2—2 of FIG. 6, on a greatly enlarged scale, showing a preferred embodiment of this invention;

FIGS. 3–5 are views, on an enlarged scale, similar to FIG. 2 showing three alternate embodiments of this invention;

FIG. 6 is a bottom plan view of the hole saw, on an enlarged scale, which shows the tooth group of FIG. 3;

DETAILED DESCRIPTION OF THE PREFERRED EMBODIMENT

Figure 7:
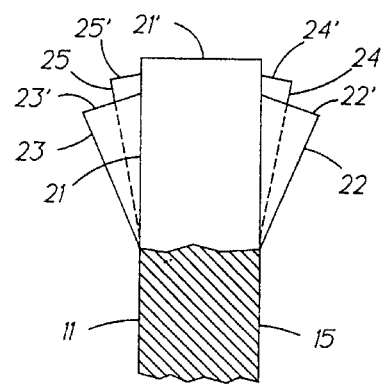
FIGS. 7 and 8 are sectional views, on an enlarged scale, as taken along line 7—7 of FIG. 9 and line 8—8 of FIG. 10 showing two further embodiments of this invention.

Referring in detail to the drawings in FIG. 1, is shown a preferred embodiment of this invention in which a cylindrical cutting tool or hole saw is shown generally at 8. The cutting tool comprises a generally rigid metal cup 9, usually of tool steel having a closed end provided by a drive plate 10 (FIG. 6), adapted to be connected to an arbor 13 for interconnection to a drive plate 10 by means of a central opening 5 adapted to receive a drill bit 7 and two eccentrically spaced openings 17 adapted to receive drive pins extending from the arbor of a power drill or drill press, as disclosed in U.S. Pat. No. 5,154,552 and No. 5,246,317, for example. As is conventional in using such hole saws, a pilot drill bit, as shown at 7, extends outwardly of the cutting edge of the hole saw at the center of rotation thereof. The drill bit 7 serves to guide the hole saw into contact with the work and to maintain the hole saw in cutting orientation during the initial phase of the cutting operation. The outer edge portion of the cylindrical cup 9 is a saw tooth cutting edge 12 and which may comprise one of many and varied arrangements of saw teeth, as illustrated in a greatly enlarged scale in FIGS. 2–7. In addition, the cylindrical saw tooth edge portion of the cup 9 is further defined by an outer surface 11 and an inner surface 15 coaxial about its axis or geometric center x.

This invention relates generally to any of the arrangements in repetitive groups of saw teeth, as depicted in one of FIGS. 2–7, and various modifications thereof. The saw tooth edge 12 may include groups with an unset raker tooth 21 disposed in advance of the set teeth in the direction of rotation a (FIG. 1) of the cutting tool. The raker tooth 21 may be the same height as one or both pairs of set teeth, as illustrated respectively in FIGS. 2 and 3, or of greater height than both pairs of trailing teeth 22 and 23, as illustrated in FIG. 4. Just as with the other teeth in the group embodying this invention, the raker tooth has a cutting edge 21' disposed in a surface of rotation or "cutting path" different than all the other surfaces of revolution or "cutting paths" of the saw tooth group of the hole saw. A hole saw is shown in FIG. 5 which is generally similar to that shown in FIG. 4, except that no raker tooth 21 is provided and, in addition, as shown the hole saw, may be provided with at least one additional tooth per group which may be radially displaced so that it will extend either from the inner or the outer surface 28 and 29, respectively, depending on its intended function. In that connection, a single tooth, such as 28 in FIG. 5, may be provided in each group of teeth and which is disposed to extend inwardly of the inner surface 15 of the hole saw for facilitating removal of the cutout or plug p (FIG. 1) from the hole saw. A tooth, as at 28, serves to finish the outer periphery to a smaller outer diameter than would otherwise be the case, so that the plug p can be easily removed or will drop from the hole saw when it is cut through the work.

It has also been found that hole saws manifest greater wear on the teeth that extend outwardly of the outer surface of the hole saw and it may therefore be desirable from the standpoint of improved wear life of the cutting edge to locate an extra tooth 29 as depicted in FIG. 5 in each group so that the extra tooth extends outwardly of the outer surface 11 of the hole saw as illustrated in FIG. 5. It will be realized by those skilled in the art that a single tooth of the type shown and described could also be included in any of the other groups of teeth shown in FIGS. 2–4, 7 and 8.

As will be noted in the cross-sectional views of FIGS. 2–7, the cutting edges 21'–26' are all depicted as straight lines. It must be recognized, however, that these lines are merely representative of an instantaneous condition since the tool 8 is rotated about its central axis x. The significance is that each line 21'–25' is representative of a surface of rotation. In the case of edge 21', the surface of rotation is an annulus whereas each of the other cutting teeth would have a cutting path, or surface of revolution of conical configuration. It will moreover be noted that each conical cutting path is independent of each of the other cutting paths. Further, set distance of the cutting edge of each of the first trailing teeth 22 and 23 of a four set tooth group is approximately 50% of the set distance of the each of the second trailing teeth 24 and 25. The significance of this relationship is that none of the cutting edges 22'–25' is preceded, or eclipsed by any other cutting edge movable in the same surface of rotation as that cutting edge. Viewed from the standpoint of the "depth-of-cut" capability of the teeth in such an arrangement, it has been determined that each of the teeth of the group has an accumulated pitch distance of five, whereby it will be understood that each tooth is adapted to cut the same size chips from the work. Each tooth of each recurrent group is therefore adapted to cut chips of generally uniform size, i.e., of equal depth and width and to cut such chips for approximately the same time without requiring excessive pecking movement of the cutter for periodic release of the chips.

In addition to the saw tooth arrangements depicted in FIGS. 2–5, it is also within the scope of this invention that the sequential order of teeth 22 and 23 and of teeth 24 and 25, may be reversed whereby the sequence of the set teeth may be left, right, left, right, or visa versa.

In operation of the hole saw 8, outwardly directed forces f (FIG. 6) on the inwardly displaced teeth 24 and inwardly directed forces f' on outwardly displaced teeth 25, such as when they are impacting against the sides of a kerf formed in a workpiece being cut, tend to counterbalance each other. Such forces in combination with the structural rigidity of hole saws, are sufficient to stabilize such hole saws against lateral deviation, wobble or vibration, which are commonplace in planar type saws.

So long as any particular tooth arrangement has, as its common denominator, the following parameters, it is within the scope of this invention: each group of teeth comprises at least four teeth 22, 23, 24, 25 disposed in radially displaced relation on one or both sides of cylinder 9. The teeth 22–25 need not be arranged in pairs, as has been customary, nor placed on alternate sides of the group and can be in any order. In addition, the cutting edges of each tooth of the group is generally disposed in a surface of rotation separate and distinct from surfaces of rotation of the other cutting edges of the tooth in the group.

It is also within the scope of this invention to utilize four or six tooth groups with a set of one-half of the teeth of that group being disposed so that the radially displaced teeth extend outwardly of the same side surface of the cylindrical cup or cylinder portion 9 of the hole saw 8. The remainder or the other set of one-half of the group of teeth may extend outwardly of the other side surface 11 of the hole saw 8. A raker tooth 21 may be utilized between each half set of the group of teeth.

Figure 9:
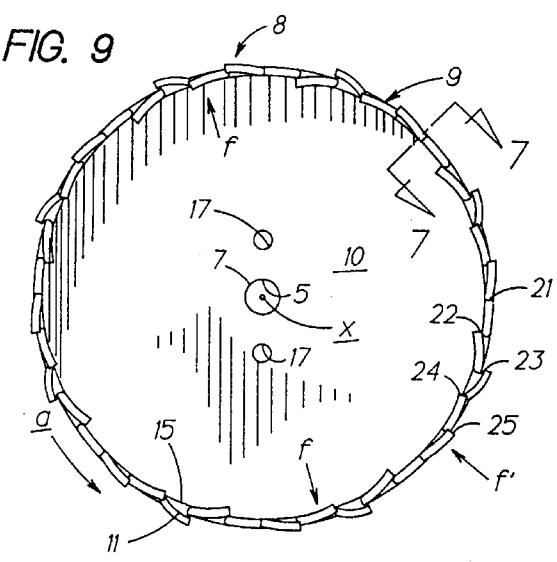
FIG. 9 is a bottom plan view of the hole saw having a tooth group as depicted in FIG. 7.

Depicted in FIGS. 7 and 9 is an arrangement of a five tooth group comprising a raker tooth 21 and four radially displaced teeth 22–25, in which the lead teeth 22 and 23 are lower and more heavily set, while the higher and less widely displaced teeth 24 and 25 are in the trailing position relative to its direction of rotation of the hole saw.

Figure 8:
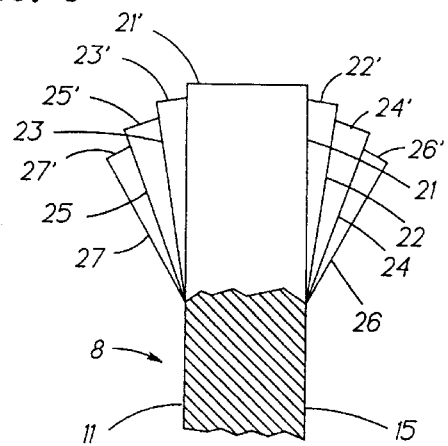
Figure 10:
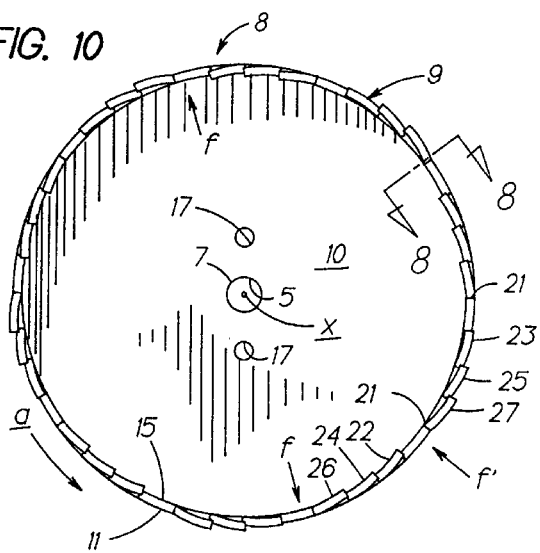
FIG. 10 is a view similar to FIG. 9 of the tooth group, as depicted in FIG. 8.

Shown in FIGS. 8 and 10, is a seven tooth group embodying this invention comprising a raker tooth 21 and six radially displaced teeth 22–27. The first teeth of the group, i.e., 23, 25 and 27, all of which are displaced outwardly of the same side of the cylindrical outer surface 11 of the cylinder portion of the saw 8. The remaining three teeth, i.e., 22, 24 and 26, of that tooth group are all arranged similarly to the first three teeth set of the group, except that they are all displaced radially inward of the inner surface 15 of the cylinder 9, or of the hole saw 8. A raker tooth 21 may be optionally interposed between the last tooth 27 of the first set and the first tooth 22 of the second set of the group. The respective cutting edges 23', 25'–27' of each of the teeth, identified by the same basic reference character, is defined as being disposed in the path of rotation or revolution as the hole saw rotates about its axis of rotation x.

Moreover, the radial displacement of the cutting edge of the first tooth 22 of minimal displacement is approximately one-third, or 33% of the trailing tooth 26 of maximum displacement and the second trailing tooth 24 of medial displacement has a set distance of two-thirds or 67% of the tooth 26 of maximum displacement. On the other hand, the extent of radial displacement for each tooth of the five tooth group with two set teeth on each side of the hole saw, is that each tooth of minimum or lesser radial displacement has a displacement of approximately one-half or 50% of the tooth of maximum displacement.

Hole saws produced in accordance with this invention were tested in actual operation for comparison with the most similar hole saws presently available on the market. In each of the comparative tests, tabulated below, the comparable hole saws are hereinafter referred to as "standard hole saws" were those having a variable pitch pattern of 4/6 teeth per inch having teeth of equal height and a magnitude of set. The tooth spacings were: 0.168, 0.186, 0.230, 0.250, 0.240, 0.208, 0.176 which calculates as follows 1/0.168=5.98 and 1/0.250=4, with those results rounded-off to the nearest whole number and used to designate the standard hole saw as one having a variable pitch pattern 4/6 teeth per inch. Hole saws embodying this invention and referred to as "improved hole saws" in the tabulated test data, with tooth spacings of 0.203, 0.231, 0.261, 0.246, 0.218, calculates as follows: 1/0.203=4.93 and 1/0.261=3.83. When rounded off, a variable pitch pattern of 4/5 teeth per inch and the only difference, other than the pitch of the hole saws tested, was that the teeth of the improved hole saw were set in accordance with this present invention. In particular, as shown in FIG. 2, the teeth included a leading raker tooth 21 followed by two lightly set teeth 22 and 23 of the same height as the raker before being set and thereafter, by two shorter and wider set trailing teeth 24 and 25.

Three separate groups of tests were performed: the first group involved hole saws of 2" in diameter; the second 1.5"; and the third 1". In each test, the hole saws cut a 0.100" workpiece of 304 stainless steel on a drill press operated at a cutting speed of 228 rpm feed force of 100 pounds while using no lubricant. In each of the three test groups, five improved and five standard hole saws, were run for comparison of cutting time and wear life of both types of hole saws. In comparing 2" diameter hole saws, both the standard and improved hole saws were run to failure. The improved hole saws, however, showed remarkable improvement of approximately 50% in wear life and 36% in average cutting time over the standard hole saw.

The 1½" and 1" diameter hole saws of both standard and improved type, were both tested as above and the standard type were run to failure and for the improved hole saws, the testing was terminated after 50 cuts although, in all cases, the improved hole saws were still capable of further cutting. It was found in all three tests that hole saws embodying this invention had far superior wear life and faster cutting time than the standard hole saw. In fact, the average number of cuts of the improved hole saw was about 170% improvement over the standard hole saw and the cutting time of the improved cutter was 27% improvement over the standard cutter. Finally, the 1" diameter hole saw, the average number of cuts of the improved product showed approximately a 400% improvement over the standard product and 34% improvement cutting time. The test results are tabulated as follows:

|  | Hole Saw #1 (Cuts) | Hole Saw #2 (Cuts) | Hole Saw #3 (Cuts) | Hole Saw #4 (Cuts) | Hole Saw #5 (Cuts) | Average Number of Cuts | Average Cutting Time/Cut (Seconds) |
|---|---|---|---|---|---|---|---|
| Hole Saw Diameter: 2 inches | | | | | | | |
| Standard Hole Saw | 13 | 19 | 11 | 12 | 16 | 14.2 | 25.8 |
| Improved Hole Saw | 14 | 22 | 18 | 17 | 35 | 21.2 | 16.8 |
| Hole Saw Diameter: 1½ inches | | | | | | | |
| Standard Hole Saw | 32 | 25 | 03 | 27 | 05 | 18.4 | 31.7 |
| Improved Hole Saw | 50 | 50 | 50 | 50 | 50 | 50 | 23.0 |
| Hole Saw Diameter: 1 inch | | | | | | | |
| Standard Hole Saw | 13 | 04 | 09 | 02 | 18 | 9.8 | 30.8 |
| Improved Hole Saw | 50 | 50 | 50 | 50 | 50 | 50 | 20.4 |

Contrary to expectations concerning these tests, the results were so much better than applicant had expected that after checking and reconfirming the results, a decision was made to manufacture and market a line of hole saws embodying this invention.

Although the present invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. Cutting tool of generally cylindrical configuration rotatable about a central axis and defined by coaxial inner and outer surfaces and an axially forward portion defining a saw tooth cutting edge disposed generally between said surfaces and comprising a plurality of repetitive groups of teeth, each group including at least four set saw teeth having cutting edges radially displaced inwardly and outwardly of said inner and outer surfaces, said teeth being disposed successively in the direction of rotation of the tool with the cutting edge of each tooth of the group being disposed generally in a surface of rotation separate and distinct from the surfaces of rotation of the other cutting edges of the teeth in said group and said teeth being variably set radially so that the cutting edge of each tooth of said group includes an effective portion unmasked by any portion of said teeth rotatable in advance of said each tooth whereby when moving relative to the work at a given rotational speed and urged into the work at a given pressure, each tooth cuts a chip of generally the same thickness and width as each of the other teeth of said group.

2. Cutting tool of generally cylindrical configuration, as set forth in claim 1, and in which each group further includes a leading raker tooth.

3. Cutting tool of generally cylindrical configuration, as set forth in claim 1, and in which each successive tooth of said group is substantially different in height than any other tooth displaced outwardly of the same side of the cylinder.

4. Cutting tool of generally cylindrical configuration, as set forth in claim 1, and in which each successive tooth of said group is substantially different in height and in the radial displacement thereof than any other tooth displaced outwardly of the same side of the cylinder whereby the accumulated pitch of each tooth of the group is equal to the number of teeth of the said group.

5. Cutting tool of generally cylindrical configuration, as set forth in claim 1, and in which each group includes a non-set leading tooth and at least four set trailing teeth having cutting edges displaced radially inwardly and outwardly of said inner and outer surfaces of the cylinder and the amount of radial displacement of a tooth from the adjacent side surface of the cutter being inversely proportional to the height of the tooth relative to the other teeth on the same side of the cutter.

6. Cutting tool of generally cylindrical configuration, as set forth in claim 1, and in which each group comprises a raker tooth and at least four radially displaced teeth, at least two of latter teeth being displaced a predetermined distance from the adjacent side surface of the cutter so that the effective cutting edge portions of said teeth are radially approximately equal.

7. Cutting tool of generally cylindrical configuration, as set forth in claim 1, and in which each group comprises a raker tooth and at least four trailing teeth, at least two of said trailing teeth being radially displaced on opposite sides of the inner and outer surfaces of said cutting tool, the first of trailing teeth being approximately the same height as the raker tooth before being displaced and at least two additional trailing teeth which are each shorter in length and having greater radial displacement than the first of the trailing teeth, the displacement of the first trailing teeth being approximately 50% of the displacement of the second trailing teeth.

8. Cutting tool of generally cylindrical configuration, as set forth in claim 1, and in which each group of teeth includes at least six radially displaced teeth and in which three of said teeth are displaced radially outward one of said side surfaces in variable amounts characterized by maximum, minimum and medial radial displacement and wherein the effective cutting edge portions of the teeth of minimum and medial displacement are approximately ⅓ and ⅔ of maximum displacement and the tooth having said maximum displacement.

9. Cutting tool of generally cylindrical configuration, as set forth in claim 1, and in which the saw tooth cutting edge comprises a plurality of repetitive groups of saw teeth with one-half of said plurality of teeth being consecutively displaced inwardly and the other half being displaced outwardly of said inner and outer surfaces.

10. Cutting tool of generally cylindrical configuration, as set forth in claims 5, and in which each group also includes at least one other tooth displaced radially to extend inwardly of the inner surface of the cutting tool to facilitate removal from the tool of the plug cut thereby.

11. Cutting tool of generally cylindrical configuration, as set forth in claims 5, and in which each group also includes at least one other tooth displaced radially to extend outwardly of the outer surface of the cutting tool to increase the wear life of said cutting tool.

12. Cutting tool of generally cylindrical configuration rotatable about a central axis and defined by coaxial inner and outer surfaces and an outer edge portion defining a saw tooth cutting edge disposed generally between said surfaces and comprising a plurality of repetitive groups of teeth, each group including a raker tooth and at least four set trailing teeth, at least two of said trailing teeth being radially displaced on opposite sides of the inner and outer surfaces of said cutting tool, the first of the trailing teeth being approximately the same height as the raker tooth before being displaced and at least two additional trailing teeth which are each shorter in length and having greater radial displacement than the first of the trailing teeth, the displacement of the first trailing teeth being approximately 50% of the displacement of the second trailing teeth, said teeth being disposed successively in the direction of rotation of the tool with the cutting edge of each tooth of the group being disposed generally in a surface of rotation separate and distinct from the surfaces of rotation of the other cutting edges of the teeth in said group and said teeth being variably set radially so that the cutting edge of each tooth of said group includes an effective portion unmasked by any portion of said teeth rotatable in advance of said each tooth whereby when moving relative to the work at a given rotational speed and urged into the work at a given pressure, each tooth cuts a chip of generally the same thickness and width as each of the other teeth of said group.

* * * * *